Oct. 29, 1946. R. C. FERGASON 2,410,280
TRACTOR COUPLING DEVICE
Filed July 2, 1942
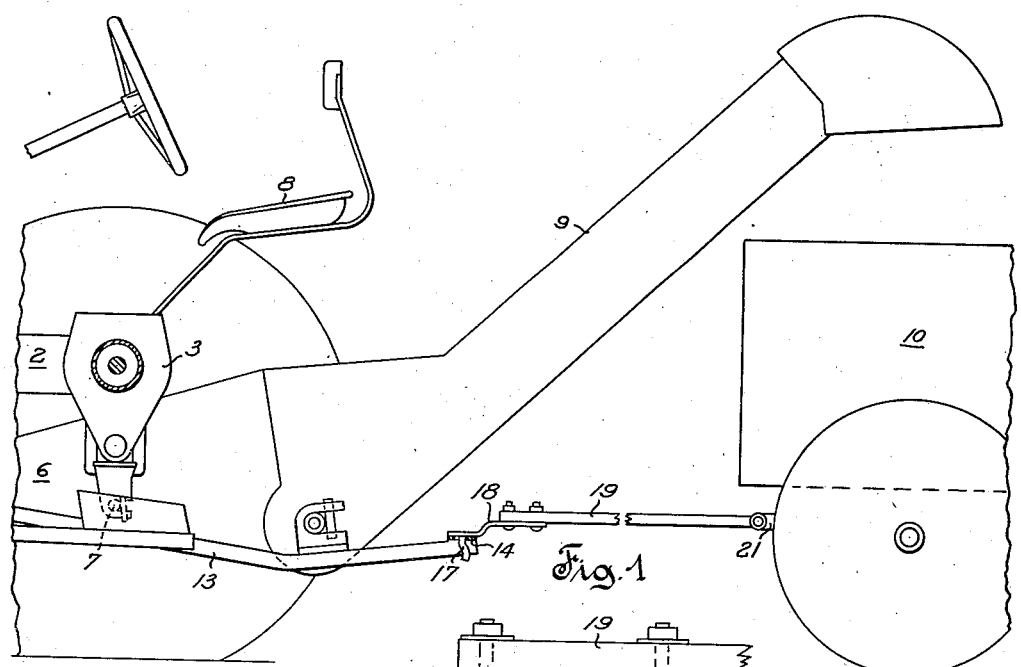
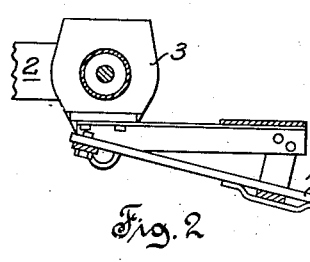
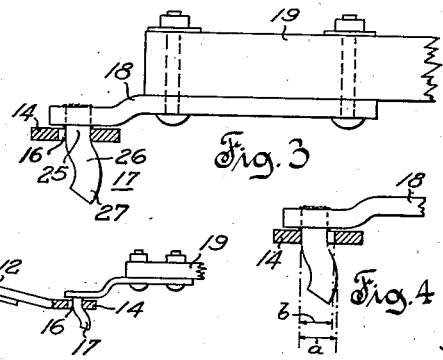
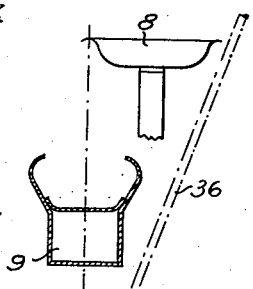
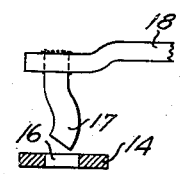
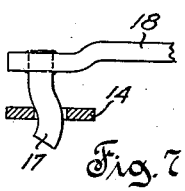
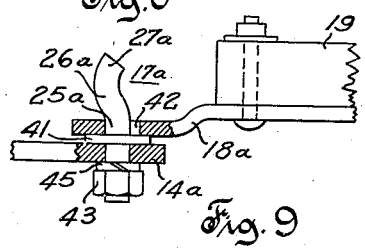
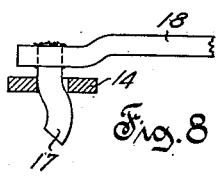

Patented Oct. 29, 1946

2,410,280

UNITED STATES PATENT OFFICE 2,410,280

TRACTOR COUPLING DEVICE

Rector C. Fergason, La Porte, Ind., assignor to Allis-Chalmers Manufacturing Company, Milwaukee, Wis., a corporation of Delaware Application July 2, 1942, Serial No. 449,407

12 Claims. (Cl. 280—33.44)

This invention relates in general to coupling devices of utility in coupling vehicles, and it has more particular utility as a coupling or hitch for connecting a trailing wagon or implement to a tractor or the like.

Devices of the prior art for coupling trailing wagons or implements to a tractor or the like which have heretofore been used for transmitting the pulling or backing power of the tractor to the wagon or implement, and at the same time securing the latter against uncoupling during travel over rough ground are relatively complex as to design and number of parts and operations involved in effecting the secure coupling and the uncoupling of the trailing vehicle or implement. Most of these prior hitches or couplings include, in addition to the actual power transmitting portion of the coupling, one or more separate latching or securing devices, either manually or automatically operated, for providing against accidental uncoupling during normal operation. The practical result of the prior art couplings of this character is that they involve additional cost of manufacture and they are in such form that it is impossible or extremely difficult for a tractor operator from his position on the tractor seat, to readily effect the coupling and uncoupling of the trailing vehicle or implement.

The present invention is directed toward the provision of an extremely simple and inexpensive form of hitch or coupling between a tractor or like draft vehicle and a trailing implement or wagon and which involves a hitch or coupling pin element of special form cooperative with an apertured draft element, the design of the parts being such that the coupling may be readily connected and disconnected by an operator from his normal position on a tractor and wherein the coupling pin element secures itself against accidental uncoupling.

Particular advantages are attained in accordance with the present invention through providing a draft portion of one of the elements, the pulling or the trailing vehicle, with a hitch or coupling pin extending in a generally vertical direction therefrom and having an offset portion or projection, in the normal line of draft and insertable through an aperture in the other connected element, the pin and the aperture being of such dimensions in the normal line of draft as to prevent accidental removal of the coupling pin from the aperture during any operation of the vehicles over rough ground.

It is an object of the present invention to provide an improved coupling device of simple design and readily operable to coupled and uncoupled conditions and automatically secured against accidental uncoupling.

It is a further object of this invention to provide an improved form of coupling or hitch including a coupling pin mounted on one of the parts to be coupled and insertable in an aperture in the other part to be coupled, the pin and the aperture being of such conformation as to permit ready insertion of the pin to coupled position in the aperture and to prevent accidental removal of the pin from coupling position.

It is a further object of this invention to provide an improved form of coupling or hitch for coupling vehicles or implements to a tractor and comprising a hitch or coupling pin on a draft portion of one of the parts and insertable within an aperture in a draft portion of the other part, and wherein the pin is of such formation or design with respect to the aperture as to permit ready insertion of the pin to and its removal from coupled position by the tractor operator from his position on the seat of the tractor, and to prevent accidental uncoupling during operation of the tractor and vehicle.

The above and other objects and advantages are attained by the present invention, various novel features of which will be apparent from the description herein and the accompanying drawing, disclosing embodiments of the invention, and will be more particularly pointed out in the annexed claims.

In the accompanying drawing,

Fig. 1 is a side elevation, with parts broken away, showing an embodiment of the invention in a coupling between a tractor, through an implement carried thereby, and a trailing wagon.

Fig. 2 is a view similar to Fig. 1, showing the invention applied to an ordinary form of drawbar on a tractor.

Fig. 3 is an enlarged side elevation of a detail shown in Figs. 1 and 2, with the coupling parts in pulling position.

Fig. 4 is a view similar to Fig. 3, with the coupling parts in backing position.

Fig. 5 is a diagrammatic rear view, with parts in section, of a portion of the apparatus shown in Fig. 1, with parts of the coupling in position preliminary to actual coupling.

Fig. 6 is a fragmental side elevation of the coupling parts in position preliminary to actual coupling operation.

Fig. 7 is a view similar to Fig. 6, showing the parts in a further stage of the coupling operation.

Fig. 8 is a view similar to Figs. 6 and 7, with the coupling parts in an intermediate stage of the uncoupling operation.

Fig. 9 is a view similar to Figs. 2 and 3, showing a modified form of coupling.

As illustrated in the drawing, a tractor 2 of conventional design and carrying an engine at the forward part of the tractor frame includes a rear axle housing 3 having depending side portions. An implement 6, in the form of a corn harvester, is mounted on the tractor through journaled portions on the frame of the harvester pivotally mounted in bearings on the depending side portions of the tractor rear axle, as indicated at 7, and held against movement, other than pivotal movement, relative to the tractor, and with the front end of the harvester free to move up and down on the pivotal mounting to a limited extent, under the control of the tractor operator from his seat 8 on the tractor. A rearwardly and upwardly extending elevating conveyer 9 may be provided for conveying corn from the harvester to a trailing wagon 10, the elevating conveyer being preferably mounted at its lower end on the rear end portion of the frame of the harvester, or on the tractor frame, in a suitable manner.

The tractor is provided with a drawbar or draft frame 12 to which the trailing wagon 10 is suitably connected so that it may be drawn along by the tractor. This draft frame or drawbar is usually secured to the rear portion of the tractor frame, as indicated in Fig. 2; but, as indicated in Fig. 1, the drawbar or frame is constituted by a rearwardly extending portion of the longitudinal bars 13 of the harvester frame. A draft plate 14 is connected across the rear end of the bars 13 of the harvester frame or the rear end of the tractor drawbar of frame 12.

The draft plate 14 is provided with an aperture 16 for reception of a hitch or coupling pin 17 projecting downwardly from a draft element, in the form of a hitch plate 18 mounted on and projecting forwardly from the forward end of a tongue or pole 19 pivoted on a horizontal axis to a portion of the frame 21 of the wagon 10 or other drawn vehicle or implement.

The weight of the wagon tongue is sufficient under normal conditions to maintain a conventional form of hitch pin in position in the aperture 16 of the drawbar or draft plate, so as to permit pulling or backing operation. However, if the weight of the wagon tongue were relied on solely to maintain an ordinary hitch pin in coupling relation, without a securing nut or latch or the like, the pin would jump out of coupled position as the tractor and wagon travel over rough ground. To provide against accidental separation of the wagon tongue from the draft bar or frame of the tractor, while maintaining the simplicity of construction involved in the use of a single hitch pin and at the same time avoiding complications of additional securing means, the hitch pin 17 is of a particular design permitting coupling and uncoupling operations by the tractor operator while seated on the tractor, but preventing undesirable or accidental uncoupling during travel of vehicles.

As indicated, the hitch pin 17 comprises an upper vertical portion 25 adjacent the tongue hitch plate 18 and a rearwardly bent or inclined lower portion 26 having its lower end portion turned forwardly along a curve, as indicated at 27. The forward edge of the lower end portion does not extend forwardly as far as the forward edge of the upper vertical portion 25. The pin is preferably formed from round stock and its diameter, or the front to rear dimension, is slightly less, preferably approximately 25%, than the diameter, or the front to rear dimensions, of the aperture 16 in the drawbar or frame. However, the horizontal dimension $a$ from the forward edge of the upper portion 25 of the pin to the rear edge of the inclined or bent portion 26 is greater than the diameter, or the front to rear dimension $b$, of the aperture 16, as will be apparent from Fig. 4, to the end that the pin cannot be fully inserted in or withdrawn from the aperture by a simple vertical movement of the pin.

During normal operation, with the tractor pulling the wagon, the weight of the wagon tongue holds the coupling pin in normal position with the rear wall of the aperture 16 engaging the rear side or edge of the upper vertical portion 25 of the pin. And under these conditions, accidental removal of the pin from the aperture 16, either by upward movement of the wagon tongue relative to the drawbar or downward movement of the drawbar relative to the wagon tongue, as during travel over rough ground, is prevented by engagement between the lower edge of the drawbar at the rear edge of the aperture 16 and the upper surface of the inclined portion 26 of the pin at the rear side thereof, as will be apparent from Fig. 3. And during backing operation, accidental separation is likewise prevented through engagement between these parts, as will be apparent from Fig. 4.

In coupling the tractor to the wagon, the tractor is backed to a position wherein the coupling aperture 16 of the drawbar is in fore and aft alinement with and adjacent the front end of the wagon tongue. The tractor operator then reaches downwardly and places the hook portion 35 of a cane or operating rod 36 beneath the forward end of the tongue and raises the latter until the coupling pin 17 is above the draft bar; and then the tractor is backed until the aperture 16 in the drawbar is beneath the lower end of the hitch pin, the tractor being preferably backed to a point where the rear edge of the bent portion 26 at the rear side of the pin is slightly forward of the rear edge wall of the aperture 16, as generally indicated in Fig. 6. The operator then allows the wagon tongue to drop, and the lower end of the pin enters the aperture to a position where the forward or underneath side of the inclined portion 26 of the pin engages with the forward edge of the wall of the aperture 16, generally as indicated in Fig. 7. The relative dimensions of the several parts of the pin and the aperture 16 are such that the pin will remain in this position until the tractor is moved forward slightly or the wagon tongue is moved rearwardly to a slight extent. During such latter fore or aft relative movement of the parts, the upper end of the pin is gradually cleared with respect to the forward edge of the aperture 16 and the pin drops to normal coupled position within the aperture. The completion of the insertion of the pin from a position generally as indicated in Fig. 7, may be effected by a forward jiggling of the wagon tongue, which may be accomplished by the operator from his seat on the tractor, through the operating rod 36, particularly if the wagon is not loaded to any appreciable extent.

In uncoupling the hitch, the tractor is backed so that the hitch parts are in approximately the position indicated in Fig. 4; and the operator, through his operating rod 36 lifts the wagon tongue, thus raising the hitch pin 17 to a position relative to the drawbar, as indicated generally in Fig. 8. The tractor may then be moved forward slightly, and during this movement, the rear edge of the aperture 16 gradually clears the rearwardly projecting portion 26 of the pin and the latter is drawn up to fully removed position. This removal of the pin may be accomplished by a backward jiggling of the wagon tongue by the operator during the lifting of the wagon tongue.

In Fig. 9 an arrangement is shown wherein the hitch pin 17a is secured, preferably in a detachable manner, to a draft plate or drawbar 14a. As indicated, the upper or active hitch portion is of the same shape as the corresponding portion of the hitch pin 17 described hereinabove, except for reversal of position of the several parts of the pin, so that the inclined or bent portion 26a, which prevents accidental uncoupling, is at the forward side of the pin. The lower portion of the pin is provided with a flange 41 of a size to overlap the aperture 16 in the drawbar and the aperture 42 in the hitch plate 18a. The lower end of the pin passes through the aperture in the drawbar or plate, and a nut 43 is drawn up on the threaded lower end of the pin against a lock washer 45 to hold the pin securely in position on the drawbar, with the flange 41 bearing against the upper side of the drawbar.

With the tractor pulling, the vertical portion 25a engages the forward edge of the aperture 42 in the hitch plate 18a; and with the tractor backing, the portion 25a of the pin engages the rear edge of the aperture 42 in the hitch plate. As will be apparent from the description hereinabove, engagement between the forward edge of the aperture 42 and the forward or underneath surface of the bent portion 26a at the forward side of the pin prevents accidental uncoupling of the parts.

In coupling the parts, the tractor is backed to a suitable position with respect to the trailing wagon, so that, with the wagon tongue hitch plate raised above the pin, the forward edge of the aperture 42 in the hitch plate will just clear the forward edge of the projection or bent portion 26a of the pin; and when the tongue is lowered, the hitch plate passes downwardly over the pin until the rear edge of the aperture 42 engages the upper or rear side or edge of the bent portion 26a of the pin. On moving the tractor forward slightly, or jiggling the tongue rearwardly, the hitch plate drops to normal coupled position with respect to the pin.

The required operations in uncoupling the parts by the operator will be apparent from the description hereinabove, it being pertinent to note merely that after the hitch plate is raised to a point where the forward edge of the aperture 42 of the hitch plate engages the underside of the bent portion 26a of the pin, the tractor may be moved forward slightly and the hitch plate raised gradually to wholly separate it from the coupling pin.

It will be apparent from the description hereinabove that the invention provides an extremely simple and effective form of coupling or hitch and that the necessary operations of coupling and uncoupling may be readily accomplished by an operator on the draft vehicle.

It should be understood that the invention is not limited to the particular details of design and construction described herein and that the invention also includes such other forms and modifications as are embraced within the scope of the annexed claims.

It is claimed and desired to secure by Letters Patent:

1. A device for detachably coupling a trailing element to a tractor or the like, comprising a draft member for the tractor, a draft member for the trailing element, one of said draft members being provided with an aperture, the other of said draft members being provided with a coupling pin receivable in said aperture to effect coupling of said draft elements, said pin comprising a substantially vertical portion adjacent the point of attachment of the pin to its draft element and constituting a normal draft transmitting medium between the coupled parts and a portion extending from said vertical portion in a direction inclined forwardly or rearwardly therefrom, the front to rear thickness of said pin being appreciably less than the front to rear dimension of said aperture, and said inclined portion providing abutment surface elements engageable with the adjacent portion of the wall of said aperture to prevent accidental uncoupling of the draft elements during the application of both draft and backing force to said trailing element.

2. A device for detachably coupling a trailing element to a tractor or the like, comprising a draft member for the tractor, a draft member for the trailing element, one of said draft members being biased downwardly, one of said draft members being provided with an aperture, the other of said draft members being provided with a coupling pin receivable in said aperture to effect coupling of said draft elements, said pin comprising a substantially straight portion adjacent the point of attachment of the pin to its draft element and a portion extending from said straight portion in a direction inclined forwardly or rearwardly therefrom and providing an abutment surface at one fore or aft side engageable with the adjacent edge portion of the wall of said aperture, to prevent complete reception of said pin to coupled position in said aperture without accompanying fore and aft relative movement of said draft elements after partial reception of said pin and an abutment surface at the opposite fore or aft side of said pin engageable with the adjacent edge portion of the wall of said aperture to prevent accidental uncoupling of the coupled draft elements.

3. A device for detachably coupling a trailing element to a tractor or the like, comprising a draft member for the tractor, a draft member for the trailing element, said first draft member being provided with an aperture, said second draft member being provided with a downwardly projecting coupling pin insertable through the aperture in said first draft member, said pin comprising a vertical upper portion constituting a normal draft transmitting medium between the coupled parts, and a portion extending downwardly therefrom and inclined in a rearward direction therefrom and providing a convex abutment surface at its rear side engageable with the adjacent edge portion of the wall of said aperture to prevent accidental removal of said pin from said aperture when said pin is in position to transmit draft and backing force to said trailing element.

4. A device for detachably coupling a trailing element to a tractor or the like, comprising a draft member for the tractor, a draft member for the trailing element, said first draft member being provided with an aperture, said second draft member being provided with a downwardly projecting coupling pin insertable through the aperture in said first draft member, said pin comprising a vertical upper portion constituting a normal draft transmitting medium between the coupled parts, and a portion extending downwardly therefrom and inclined in a rearward direction therefrom and providing an abutment surface at its upper side engageable with the adjacent edge portion of the wall of said aperture to prevent accidental removal of said pin from said aperture and providing an abutment surface at its under side engageable with the adjacent edge portion of the wall of said aperture to prevent complete insertion of said pin to coupled position in said aperture without accompanying fore or aft relative movement of said draft members after partial insertion of said pin in said aperture.

5. A device for detachably coupling a trailing element to a tractor or the like, comprising a draft member for the tractor, a draft member for the trailing member, said first draft member being provided with an aperture, said second draft member being provided with a downwardly projecting coupling pin insertable through the aperture in said first draft member, said pin comprising a vertical upper portion constituting the normal draft transmitting medium between the coupled parts, and a portion extending downwardly and inclined rearwardly therefrom, the distance between the forward edge of said vertical portion and the rear edge of said inclined portion of said pin being greater than the distance between the forward and rear edges of said aperture, said inclined portion of said pin providing an abutment surface at its upper side engageable with the adjacent edge portion of the wall of said aperture to prevent accidental removal of said pin from said aperture and providing an abutment surface at its under side engageable with the adjacent edge portion of the wall of said aperture to prevent complete insertion of said pin to coupled position in said aperture without accompanying fore or aft relative movement of said draft members after partial insertion of said pin.

6. A device for detachably coupling a trailing element to a tractor or the like, comprising a draft member for the tractor provided with a coupling pin, a draft member for the trailing element provided with an aperture in which said pin is receivable to operatively couple said draft elements, said pin including a vertical portion constituting the normal draft transmitting medium between the coupled elements, and an inclined portion projecting from said first portion in a fore or aft direction, an upper surface of said inclined portion constituting an abutment engageable with the adjacent edge portion of the wall of said aperture to prevent complete reception of said pin in said aperture without fore or aft relative movement of said draft elements when the pin is in said latter position with respect to said aperture and an under surface of said inclined portion constituting an abutment surface engageable with the adjacent edge portion of the wall of said aperture to prevent complete separation between said pin and said aperture when said pin is in partly withdrawn condition without fore or aft relative movement of said draft elements when the pin is in the latter relative position.

7. A device for detachably coupling a trailing element to a tractor or the like, comprising a draft member for the tractor provided with a coupling pin, a draft member for the trailing element biased downwardly and provided with an aperture in which said pin is receivable to operatively couple said draft elements, said pin including a vertical portion at one end thereof and constituting the normal draft transmitting medium between the coupled elements, and an inclined portion projecting from said first portion in a fore or aft direction, the distance between the rear edge of said vertical portion and the forward edge of said inclined portion being greater than the distance between the forward and rear edges of said aperture, an upper surface of said inclined portion constituting an abutment preventing complete insertion of said pin in said aperture without fore or aft relative movement of said draft elements when the pin is partly inserted to normal coupling position and an under surface of said inclined portion constituting an abutment surface engageable with the adjacent edge portion of the wall of said aperture to prevent complete withdrawal of said pin relative to said aperture when said pin is in partly withdrawn condition without fore or aft relative movement of said draft elements when the pin is in the latter position.

8. In combination, a tractor, an implement carried by said tractor and including a frame pivotally mounted on said tractor and having its rear portion serving as a support for a tractor draft member, a trailing element having a draft member, one of said draft members being provided with an aperture, the other of said draft members being provided with a coupling pin insertable through said aperture in the other said draft member to effect the normal draft coupling between said draft members, said coupling pin comprising a substantially vertical portion constituting the normal draft transmitting medium between said draft members, and a portion extending in an inclined fore or aft direction from said vertical portion, said inclined portion providing abutment surfaces at its upper and lower sides engageable with the adjacent forward or rear portion of the wall of said aperture to prevent complete insertion of said pin to and withdrawal thereof from said aperture without accompanying fore or aft relative movement of said draft members when said pin is in partially inserted condition in said aperture.

9. In combination, a tractor, an implement carried by said tractor and including a frame pivotally mounted on said tractor and having its rear portion serving as a support for a tractor draft member, a trailing element having a draft member, said first draft member being provided with an aperture, the other of said draft members being provided with a downwardly projecting coupling pin insertable through said aperture to effect the draft coupling between said draft members, said coupling pin comprising an upper substantially vertical portion constituting the normal draft transmitting medium between said draft members, and a portion extending in a downwardly and rearwardly inclined direction from said vertical portion, the distance between the forward edge of said vertical portion and the rear edge of said inclined portion being greater than the distance between the forward and rear edges of said aperture, and said inclined portion providing abutment surfaces at its upper and lower sides engageable with the adjacent rear and forward edge portions of the wall of said aperture to prevent complete withdrawal of said pin from and insertion thereof in said aperture without accompanying fore or aft relative movement of said draft members when said pin is in partially inserted condition in said aperture.

10. A device for detachably coupling a trailing element to a tractor or the like, comprising a draft member for the tractor, a draft member for the trailing element, one of said draft members being provided with an aperture, the other of said draft members being provided with a coupling element passing through the aperture in said first draft member to effect coupling of said draft elements, said coupling element being of greater overall front to rear dimension than said aperture and including a portion constituting a normal draft transmitting medium between the coupled parts, and a second portion extending from said first portion in either a forward or rearward direction therefrom, said extending portion providing an abutment cooperatively engageable at one forward or rearward side thereof with the adjacent edge portion of the wall of said aperture to prevent accidental uncoupling of said draft elements during the application of both pulling and backing force to said trailing element and engageable at the opposite forward or rearward side with the adjacent edge portion of the wall of said aperture to prevent complete insertion of said coupling element to normal draft transmitting position in said aperture without accompanying fore or aft relative movement between said draft elements after partial reception of said coupling element within said aperture.

11. A device for detachably coupling a trailing element to a tractor or the like, comprising a draft member for the tractor, a draft member for the trailing element, one of said draft members being provided with an aperture, the other of said draft members being provided with a coupling pin receivable in said aperture to effect coupling of said draft elements, said pin comprising a substantially straight portion adjacent the point of attachment of the pin to its draft element and constituting a normal draft transmitting medium between the coupled parts, and a second portion extending from said straight portion in a forwardly or rearwardly inclined direction and providing abutment surface elements at the forward or rear side of the pin and engageable with the adjacent portion of the wall of said aperture to prevent accidental uncoupling of said draft elements during the application of both pulling and backing force to said trailing element and to prevent complete insertion of said pin to normal draft transmitting position within said aperture and the withdrawal of said pin therefrom without accompanying fore or aft relative movement between said draft elements.

12. A device for detachably coupling a trailing element to a tractor or the like, comprising a draft member for the tractor, a draft member for the trailing element, one of said draft members being provided with an aperture, the other of said draft members being provided with a substantially vertically extending coupling pin receivable in said aperture to effect normal coupling of said draft elements, said pin having an appreciably greater overall front to rear dimension than said aperture and comprising a substantially straight portion adjacent the point of attachment of the pin to its draft element and constituting a normal draft transmitting medium between the coupled parts, and a portion extending from said straight portion in a forwardly or rearwardly inclined direction and providing abutment surface elements engageable with the adjacent portion of the wall of said aperture to prevent accidental uncoupling of said draft elements during the application of both pulling and backing force to said trailing element and to prevent complete insertion of said pin into or withdrawal thereof from said aperture without accompanying fore or aft relative movement of said draft elements.

RECTOR C. FERGASON.